(12) United States Patent
Bock et al.

(10) Patent No.: US 9,049,446 B2
(45) Date of Patent: Jun. 2, 2015

(54) ADAPTIVE QUANTIZATION BASED ON BIT RATIO (75) Inventors: Alois Martin Bock, Hampshire (GB); Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 982 days.

(21) Appl. No.: 13/140,203

(22) PCT Filed: Dec. 17, 2008

(86) PCT No.: PCT/EP2008/067718
§ 371 (c)(1), (2), (4) Date: Jun. 16, 2011

(87) PCT Pub. No.: WO2010/069367
PCT Pub. Date: Jun. 24, 2010

(65) Prior Publication Data
US 2011/0249728 A1    Oct. 13, 2011

(51) Int. Cl.
H04N 7/26    (2006.01)
H04N 19/194  (2014.01)
H04N 19/126  (2014.01)
H04N 19/15   (2014.01)
H04N 19/61   (2014.01)
H04N 19/14   (2014.01)

(52) U.S. Cl.
CPC ....... H04N 19/194 (2014.11); H04N 19/00096 (2013.01); H04N 19/15 (2014.11); H04N 19/61 (2014.11); H04N 19/126 (2014.11); H04N 19/14 (2014.11)

(58) Field of Classification Search
CPC .................................. H04N 19/00096
USPC .................................. 375/240.03
See application file for complete search history.

(56) References Cited

U.S. PATENT DOCUMENTS 5,818,529 A * 10/1998 Asamura et al. ......... 375/240.23
2002/0181583 A1* 12/2002 Corbera ................... 375/240.03
(Continued)

FOREIGN PATENT DOCUMENTS

EP    12500122    6/2002
GB    2444991     6/2008

OTHER PUBLICATIONS

International Search Report for PCT/EP2008/067718, mailed Sep. 4, 2009.
(Continued)

Primary Examiner — Christopher S Kelley
Assistant Examiner — Jonathan Messmore
(74) Attorney, Agent, or Firm — Baker Botts, LLP (57) ABSTRACT There is provided a method of adapting a Quantization parameter of digitally encoded video, comprising using a look-ahead encoding pass to provide look-ahead bit costs for each macroblock in a picture of interest, calculating an activity metric for each macroblock in the picture of interest, determining at least an accumulated look-ahead bit cost threshold for a low macroblock activity category, wherein the low macroblock activity category comprises macroblocks having an activity metric below a pre-determined level, sorting the macroblocks according to the calculated activity metrics of each macroblock to provide sorted macroblocks, adding sorted macroblocks to the low macroblock activity category in ascending activity order and accumulating bit costs of the added sorted macroblocks up to the determined accumulated look-ahead bit cost threshold, and applying a change in quantization parameter, Qp, to the macroblocks of the picture of interest comprising decreasing the Qp value of the macroblocks in the low macroblock activity category.

13 Claims, 6 Drawing Sheets

(56) References Cited

U.S. PATENT DOCUMENTS

2003/0169811 A1    9/2003    Kitamura et al.
2008/0165845 A1*    7/2008    Singh et al. .............. 375/240.03

OTHER PUBLICATIONS

Pun et al., "Motion-Compensated Video Coding with Adaptive Perceptual Quantization", *IEEE Transactions on Circuits and Systems for Video Technology*, vol. 1, No. 4, 1991, pp. 351-361.

* cited by examiner

FIG. 1

| Macroblock No. | Look-Ahead bit cost | Activity Metric |
|---|---|---|
| 0 | 67 | 9130 |
| 1 | 59 | 9351 |
| 2 | 64 | 8192 |
| … | … | … |
| 809 | 29 | 2403 |

FIG. 2

| Macroblock No. | Look-Ahead bit cost | Activity Metric |
|---|---|---|
| 134 | 0 | 847 |
| 269 | 0 | 999 |
| 404 | 0 | 1320 |
| … | … | … |
| 445 | 719 | 61070 |

FIG. 3

| Percent of picture look-ahead bits | Percent macroblocks | Delta percent macroblocks |
|---|---|---|
| 0.5% | 30.1 | 30.1 |
| 1.0% | 35.5 | 5.4 |
| 1.5% | 38.9 | 3.4 |
| 2.0% | 41.1 | 2.2 |
| 2.5% | 42.6 | 1.5 |
| 3.0% | 44.9 | 2.3 |
| 3.5% | 47.2 | 2.3 |
| 4.0% | 48.1 | 1.0 |
| 4.5% | 48.9 | 0.8 |
| 5.0% | 49.7 | 0.8 |
| 5.5% | 50.5 | 0.8 |
| 6.0% | 51.1 | 0.6 |
| 6.5% | 51.5 | 0.4 |
| 7.0% | 52.0 | 0.5 |

| ΔQp Low | ΔQp High | % Bits |
|---|---|---|
| -9 | 0 | 124% |
| -8 | +1 | 110% |
| -7 | +2 | 98% |
| -6 | +3 | 88% |

ADAPTIVE QUANTIZATION BASED ON BIT RATIO

This application is the U.S. national phase of International Application No. PCT/EP2008/067718 filed 17 Dec. 2008 which designated the U.S., the entire content of which is hereby incorporated by reference.

TECHNICAL FIELD

The invention is related to video coding in general, and in particular to pre-processing video signals to provide Adaptive Quantization control.

BACKGROUND

In video compression encoders, control of a degree of quantisation is an important means of controlling the coding process in order to match the capacity demands of the picture behaviour with the available output bit rate. A key parameter used extensively in current coding methods for practical compression applications (e.g. MPEG-2 and MPEG-4/H.264) is the Quantisation Parameter (Qp). Since an increased Qp value results in lower bit rates for the digital video bit stream, for a low target bit rate the value of Qp is at the high end of its nominal range (1 to 31 in MPEG-2, and 0 to 51 in MPEG-4/H.264). Conversely, where bit rate is not severely constrained, a value nearer to the lower end is chosen.

The process linking the target bit rate and the coding process, in particular the value of Qp, is known as Rate Control. The value of Qp is variable within each picture down to the level of a macroblock, but in simple coding implementations is often constant over a whole picture (i.e. fixed rate/non-adaptive quantization) and set at the value suggested by Rate Control. The result of such a simple implementation is that all the macroblocks in a picture contain a similar amount of distortion noise after decoding, regardless of how the macroblocks content and location can cover up the distortion, i.e. the choice of quantization parameter is done regardless of the behaviour of the image and without any recognition of the visible effect of the resultant coding distortions.

Adaptive quantisation, on the other hand, is used to distribute bit allocations within a picture without interfering with the Rate Control algorithm. In general, the picture quality can be improved by reducing the amount of quantisation in picture areas of lower spatial activity (i.e. smooth areas) where the human visual system (HVS) can detect distortion more easily, whereas higher spatial activities are less affected by coarser quantisation because the HVS is less sensitive in picture regions with such high activity levels. However, while some picture sequences benefit from aggressive adaptive quantisation (i.e. large deviations from the average quantisation measured over the whole picture), others are better with little or no adaptive quantisation. This implies that some degree of control is necessary to adapt the value of Qp in a beneficial manner.

Figure 1:
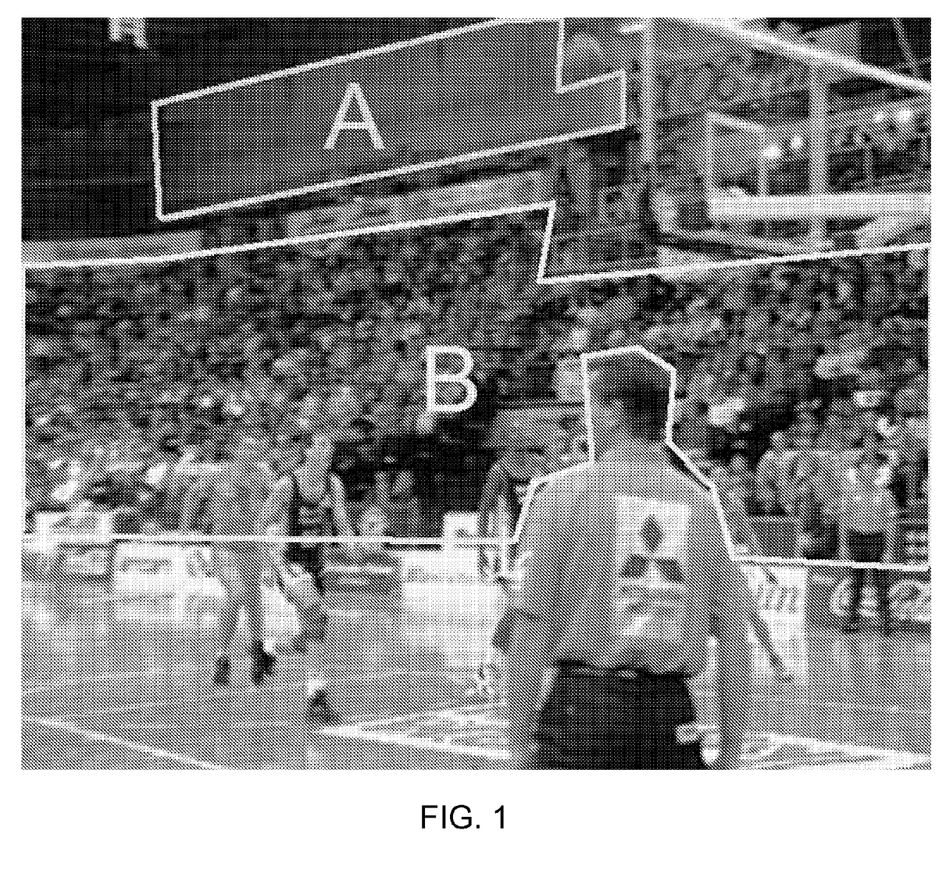
FIG. 1 shows an exemplary picture of a digital video sequence, showing how the content of the picture affects a viewer's perception of distortion.

An example is shown in FIG. 1, where distortion in the top, grey, smooth area (area A) is much more visible compared with distortion among the spectators (area B). The Qp parameter should therefore be used to lower the distortion in area A and increase the distortion in area B. Compared to using a fixed Qp value over the entire picture, it is preferable to distribute bits from high activity areas to low activity textured areas. Fortunately smooth areas are likely to be more easily compressed so we do not have to increase the Qp that much on the high activity areas for us to be able to lower the Qp enough on the smooth areas.

Adaptive Quantization is not a new idea, but a major problem with existing solutions is how to decide how much of the picture should go in each activity category (high or low). Putting too many of the macroblocks of the picture into the low activity category will distort the high activity category areas, but putting too few of the macroblocks of the picture into the low activity category will make some of the smooth areas end up in the high category, and hence prone to distortion.

Accordingly, there is herein described an improved method of and apparatus for adapting a Quantization parameter for digitally encoding video.

SUMMARY

Embodiments of the present invention provide a method of adapting a Quantization parameter of digitally encoded video, comprising using a look-ahead encoding pass to provide look-ahead bit costs for each macroblock in a picture of interest, calculating an activity metric for each macroblock in the picture of interest, determining at least an accumulated look-ahead bit cost threshold for a low macroblock activity category, wherein the low macroblock activity category comprises macroblocks having an activity metric below a pre-determined level, sorting the macroblocks according to the calculated activity metrics of each macroblock to provide sorted macroblocks, adding sorted macroblocks to the low macroblock activity category in ascending activity order and accumulating bit costs of the added sorted macroblocks up to the determined accumulated look-ahead bit cost threshold, and applying a change in quantization parameter, Qp, to the macroblocks of the picture of interest comprising decreasing the Qp value of the macroblocks in the low macroblock activity category.

Optionally, the activity metric comprises: S, where S is a spatial activity metric.

Optionally, the method further comprises increasing the Qp value of the macroblocks remaining outside the low macroblock activity category or keeping the same Qp value.

Optionally, the step of determining at least an accumulated look-ahead bit cost threshold for a low macroblock activity category further comprises determining an accumulated look-ahead bit cost threshold for a medium macroblock activity category, wherein the sorted macroblocks from zero activity to the accumulated look-ahead bit cost threshold for a low macroblock activity category are in a low activity category, macroblocks from the accumulated look-ahead bit cost threshold for a low macroblock activity category to the accumulated look-ahead bit cost threshold for a medium macroblock activity category are in a medium activity category, and a remaining number of macroblocks outside of the low and medium macroblock activity categories are in a high macroblock activity category.

Optionally, any determined accumulated look-ahead bit cost threshold is set to be a pre-determined value. This is a simplistic method that sets the thresholds in advance of processing the video.

Optionally, the determined accumulated look-ahead bit cost threshold is determined by providing an accumulated look-ahead bit cost threshold based upon a required minimum increase in a number of macroblocks encoded for a given percentage increase in look-ahead bits used, or a required minimum percentage increase in look-ahead bits used for a given a number of macroblocks encoded.

Optionally, the accumulated look-ahead bit cost threshold determination step further comprises calculating how many macroblocks of the picture of interest are encoded for each percentage increase in accumulated total bit cost, and calculating a change in number of macroblocks encoded per percentage increase in total bit cost.

Optionally, the decrease in quantization parameter, Qp, of macroblocks in the low macroblock activity category and the increase in the Qp of the remaining macroblocks comprises a Qp value range, and the method further comprises setting the Qp value range, according to the equation:

$$QP\_range = \left( \frac{\sum_{i \in High} ActivityMB_i}{NrMacroblocksHigh} - \frac{\sum_{i \in Low} ActivityMB_i}{NrMacroblocksLow} \right) / K_1$$

OR $$QP\_range = \left( \frac{\sum_{i \in High} ActivityMB_i}{NrMacroblocksHigh} \bigg/ \frac{\sum_{i \in Low} ActivityMB_i}{NrMacroblocksLow} \right) / K_2$$

wherein:
$ActivityMB_i$ is the activity of the $i^{th}$ macroblock;
NrMacroblocksHigh is the number of macroblocks in the High category;
NrMacroblocksLow is the number of macroblocks in the Low category;
$K_1$ is a first subtraction scale factor; and
$K_2$ is a second division scale factor.

Optionally, the compression standard in use is H.264, and the method further comprises offsetting the change in Qp, such that an overall adjusted bit cost of the picture of interest remains substantially similar to an initial bit cost estimate, using the equation:

$$B = \sum_{i=1}^{nr\_categories} X_i \cdot 2^{\frac{-\Delta Qp_i}{6}}$$

wherein:
$X_i$ is a look-ahead bit ratio for a particular macroblock activity category of interest;
$Qp_i$ is a difference in Qp value applied to a particular macroblock activity category of interest; and
all the look-ahead bit ratios add up 1 (i.e. 100%).

Optionally, for the case of one activity threshold and two macroblock activities and the compression standard in use is H.264, and the method further comprises offsetting the change in Qp, such that an overall adjusted bit cost of the picture of interest remains substantially similar to an initial bit cost estimate, using the equation (for the case of one threshold, and two macroblock activity categories):

$$B = M \cdot 2^{\left(\frac{-\Delta Qp\_Low}{6}\right)} + N \cdot 2^{\left(\frac{-\Delta Qp\_High}{6}\right)}$$

wherein:
$\Delta Qp\_Low$ is the difference in Qp value applied to a low macroblock activity category;
$\Delta Qp\_High$ is the difference in Qp value applied to a high macroblock activity category;
M is a first predetermined constant, based on the bit ratio of low category bit cost from the look-ahead encoding pass; and
N is a second predetermined constant, based on the bit ratio of high category bit cost from the look-ahead encoding pass.

Optionally, the steps of determining at least an accumulated look-ahead bit cost threshold for a low macroblock activity category, and adding macroblocks to the low macroblock activity category in ascending order up to the determined look-ahead bit cost threshold, are only applied to P pictures, and the method for B or I pictures instead comprises determining a percentage of a total number of macroblocks in a picture of interest that corresponds to the number of macroblocks accumulated for a closest surrounding relevant P picture, and counting macroblocks sorted in order of ascending activity metrics, up to the determined percentage of the total number of macroblocks accumulated for a closest surrounding relevant P picture.

Optionally, the step of determining a percentage of a total number of macroblocks in a picture of interest for B or I pictures uses the exact number of macroblocks accumulated for the closest surrounding relevant P picture.

Optionally, the look-ahead encoding pass used a fixed Qp value.

Optionally, the method further comprises carrying out multiple look-ahead encoding passes at different Qp values and determining a most suitable set of results.

Optionally, the look-ahead encoding pass comprises a variable Qp value derived from a rate control function that tracks an output bit rate target.

Embodiments of the present invention also provide an Adaptive Quantizer adapted to carry out any of the above method, and comprising a look-ahead encoder adapted to provide look-ahead bit cost and activity metrics for each macroblock in a picture of interest, an array manipulation circuit, and a categorisation circuit.

Embodiments of the present invention also provide a computer-readable medium, carrying instructions, which, when executed, causes computer logic to carry out any of the above method.

BRIEF DESCRIPTION OF THE DRAWINGS

A method of adapting a Quantization parameter for digitally encoding video will now be described, by way of example only, with reference to the accompanying drawings in which.

DETAILED DESCRIPTION

An embodiment of the invention will now be described with reference to the accompanying drawings in which the same or similar parts or steps have been given the same or similar reference numerals.

The basic concept is to use information from a fixed Qp look-ahead encoding pass to control the bit cost during the adaptive Qp part of encoding. The macroblock number, the macroblock bit cost and the macroblock spatial activity metric from the look-ahead encoding pass are stored for each individual macroblock in an array, as in the example shown in FIG. 2.

Figure 3:
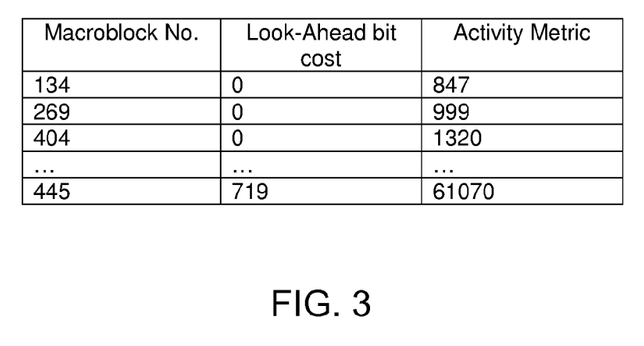
FIG. 3 shows the exemplary table of results of FIG. 2 sorted by the calculated activity metric according to an embodiment of the present invention.

This array is then sorted highest to lowest based on activity (the rightmost column), as shown in FIG. 3.

Macroblocks are then added to the low macroblock activity category selection area in activity order. The look-ahead bit cost is accumulated and the addition of macroblocks to the low activity category stops when a certain percentage of the total picture bit cost from the look-ahead encoding has been reached.

This means that if a picture has a large low activity area that is easy to compress, all of that area is put into the low category.

Look-Ahead Pass

In more detail, the described bit ratio based method for assigning activity categories to macroblocks assumes that there is a look-ahead encoding pass carried out before actual main encoding takes place. The look-ahead encoding pass provides a bit cost and an activity metric for each macroblock. Note that the look-ahead encoding pass cannot simply be a copy of the main encoding pass, since encoding decisions will need to be based on information from the look-ahead encoding pass. However, the look-ahead encoder can be a simplified encoder with less complexity than the main encoder. For example, the look-ahead encoder can be configured to operate using a fixed Qp value for all pictures. However, the look-ahead encoder can be as complex as the main encoder, if desirable for a particular implementation.

What is important is that the look-ahead encoder uses the same picture types and structure as the main encoding pass. For example, if the main encoding pass is using 3 Bi-directionally predicted pictures (B-Pictures) between Predicted pictures (P pictures) and a Group of Pictures (GOP) size of 16, then the look-ahead should use the same variables. This means that the look-ahead encoder should do the same picture type decisions, including scene cut detection, which then the main encoding pass has to follow.

The look-ahead encoding pass should collect the number of bits it spent on individual macroblocks for the bit ratio method to work. The actual numbers are in fact not vital, but what is important is the ratio in bit costs between macroblocks, i.e. it does not matter if macroblock A and B are reported to cost 10 and 20 bits respectively, or indeed 100 and 200 bits, just that the ratio of bit cost is 1 to 2. In practice, the lowest bit cost may be considered a single base unit of bit cost, with all other macroblock bit costs being based upon this base unit.

Note that the macroblock bit cost ratio differs depending on the Qp value used. A sequence encoded at a low Qp value will send noise for every macroblock, which makes macroblocks more similar in bit cost. At a high Qp value, however, many macroblocks will be skipped and cost very little. Therefore, it can be advantageous to have several look-ahead encoding passes operating at different Qp values or to have a rate control in the look-ahead encoder that tracks the output bit rate target by changing Qp between pictures.

Computing Macroblock Activities

An activity metric must be computed for each macroblock, typically during the look-ahead encoding pass. However, it may form a second separate step to the look-ahead encoding pass, carried out by separate hardware, if required. This activity metric should be correlated to the amount of distortion a macroblock can visually tolerate. Typically, there are spatial masking effects present in a video sequence, for example, parts that have smooth textures are visually very sensitive to coding distortion, while parts that are highly textured are less sensitive to coding distortion.

Embodiments of the present invention propose to use the calculated spatial activity as the activity metric.

The spatial activity can be any suitable form of macroblock activity measurement, for example:

$$\text{Activity} = \sum_{x=0}^{14} \sum_{y=0}^{15} |Y_{x,y} - Y_{x+1,y}| + \sum_{x=0}^{15} \sum_{y=0}^{14} |Y_{x,y} - Y_{x,y+1}| \quad (1)$$

Where $Y_{x,y}$ are the luminance pixel values within the target 16 by 16 pixel macroblock.

Alternatively, the spatial activity metric may be derived from the sum of all AC coefficients after a Discrete Cosine Transform (DCT) function has been applied to the macroblock of interest, or any other suitable spatial activity calculation method may equally be used, such as:

$$\text{Activity} = \sum_{x=0}^{15} \sum_{y=0}^{15} |Y_{x,y} - \overline{Y}| \quad (2)$$

Where $Y_{x,y}$ is the luminance value for each pixel in a macroblock of interest, and $\overline{Y}$ is the mean luminance pixel value for the whole macroblock of interest.

Constructing an Array and Sorting

Figure 2:
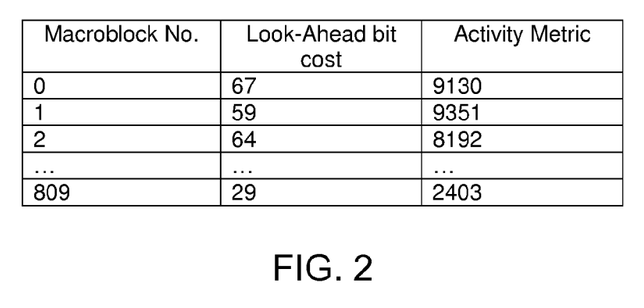
FIG. 2 shows an exemplary table of results from a look-ahead encoding pass of the video to be digitally encoded by an embodiment of the present invention.

An array consisting of macroblock number, activity metric and look-ahead bit cost is constructed, as shown in FIG. 2. This array is then sorted based on activity metric, as shown in FIG. 3. Then, the method adds macroblocks to a low macroblock activity category set of macroblocks in activity order. The look-ahead bit cost will be accumulated and the addition of macroblocks to the low level macroblock activity category will stop when the accumulated bit-cost has reached a certain percentage of the overall/total picture look-ahead bit cost.

The Importance of P Pictures

P pictures are particularly important for the proposed bit ratio method of Adaptive Quantization, since they control how the Adaptive Qp is selected for not only the P pictures, but for both I and B pictures as well.

This is because different picture types have different characteristics when it comes to bit distribution. It is often the case that I pictures have a more even bit distribution compared to a P picture. With B pictures it is the opposite, they often show a much more skewed bit distribution compared to P pictures.

If the above-described computation of macroblock spatial activity and subsequent sorting is performed on B and P pictures individually, B pictures will probably get more macroblocks placed into the low macroblock activity category (i.e. lower Qp value to be applied). This is not ideal, because B pictures are not used for further predictions; hence it is not worth spending (relatively) large amounts of bits on B pictures (i.e. a lower Qp value). Therefore, the use of a lower Qp value for a macroblock of a B picture than is used for the macroblock in its reference P picture(s) should be avoided.

Accordingly, the method in its entireness is only carried out on P pictures. The number of macroblocks put in each respective activity category for the closest P pictures are stored and then re-used for the nearest B pictures. The sorting step described is still carried out for B pictures, but now the threshold used for categorization is not based on an accumulated look-ahead bit cost threshold, but is instead simply achieved by counting the number of macroblocks and matching the threshold number of macroblocks that was used for the nearest P picture. The temporally closest P picture statistic is used as the basis for the computations carried out on each B picture. Care is taken to use the correct P picture at scene cuts—which may entail using a future P picture, rather than the previous P Picture.

For I pictures, we want the categories to be similar to the categorization for the next P picture. For example, in a scene with low motion we would like to select the same area total for both I and P pictures. Therefore, we do the same thing as we did for B pictures: we replace the accumulated look-ahead bit cost threshold with a macroblock counting threshold.

For B pictures, we have already encoded the surrounding P pictures, so the nearest relevant P picture for the B picture of interest can be used to provide the macroblock counting threshold. For an I picture when there is no scene cut, we can use the previous P picture. For the first picture in a GOP or when there is a scene cut we need to have the statistics for the P picture that follows after the I picture at the scene cut. This may be implemented by performing the method on future P pictures in the look-ahead encoding stage before analysing the B and I pictures, so that the statistics for the relevant P picture are ready for every B or I picture to be encoded.

More on Categorization

There are a few variants on how the accumulated look-ahead bit cost threshold described above should be selected. A first embodiment uses fixed accumulated look-ahead bit cost thresholds, derived through experimentation. Such experimentation has shown that when compressing standard definition TV (SDTV) or High Definition television (HDTV) using 3 B pictures between P pictures, selecting macroblocks for the low macroblock activity category until 17% of the look-ahead picture bit cost has been reached works well.

An alternative second embodiment of the method is to use the bit costs calculated in the look-ahead encoding pass to provide information on the number of macroblocks that can be put in a low macroblock activity category for a certain percentage of look-ahead bits. Consider the array of FIG. 4, where the number of macroblocks that can be selected for certain percentages of look-ahead bit ratios has been constructed.

Figure 4:
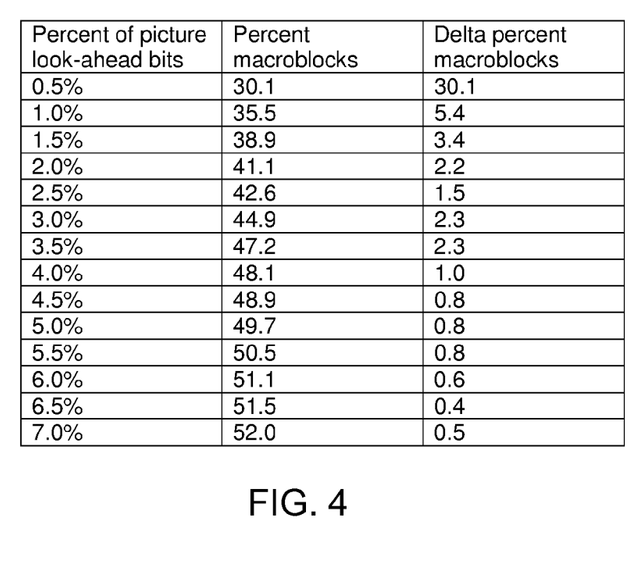
FIG. 4 shows an exemplary table of results for a percentage change in calculated look-ahead bits vs accumulated percentage of macroblocks covered by the change and step change in percentage of macroblocks.

FIG. 4 shows that since 30.1% of the picture area is covered with only 0.5% of the total number of bits required to encode the entire picture (as calculated by the look-ahead encoding pass), it is a good idea to add these 30.1% of macroblocks to the low macroblock activity category because the area affected by such a bit cost increase is so large, e.g. doubling the bits spent for the large 30.1% area only adds 0.5% bit cost increase for the entire picture.

FIG. 4 also shows that an additional 5.4% of the picture's macroblocks can be encoded for another 0.5% increase in bit cost, so it also makes it a good deal (i.e. sensible) to add them as well.

The proposed complex method for determining a suitable accumulated look-ahead bit cost threshold for the low macroblock activity category operates by choosing a minimum percentage of macroblocks to be encoded by a certain percentage of the total number of bits required to encode the entire picture.

For example, if a threshold is set where at least 0.75% more macroblocks are to be encoded for every 0.5% increase in the number of bits used, and this was applied to the figures as shown in FIG. 4, then a low macroblock activity threshold of 50.5% macroblocks would be chosen. In this case, FIG. 4 shows that these macroblocks were encoded using 5.5% of the total picture bit cost in the look-ahead pass. It is this bit cost that is used as the accumulated bit cost threshold, to work out when the accumulated look-ahead bit cost has been reached for P pictures.

Comparing the 'complex' threshold immediately above (5.5%) to the fixed threshold version previously (17%) shows how the fixed threshold version cannot accurately reflect all picture characteristic types. The picture characteristics in the example for the 'complex' threshold happen to be at a more extreme lower end. Equally, a different picture characteristic could provide a suitable 'complex' threshold of 34%. Thus the fixed threshold version is an averaged out compromise for all picture characteristics, which still results in improved Adaptive Quantization performance, but at a lower computation overhead.

It can be seen that FIG. 4 provides information on the ratio between accumulated bit cost vs no of macroblocks covered by the respective accumulated bit cost. In the case of FIG. 4, the table has been structured with the results of the look-ahead pass ordered using stepwise increments in the bit cost. That is, FIG. 4 provides a measure of how many macroblocks are covered by a given amount of bit cost (i.e. number of macroblocks is a function of bit cost).

However, in an alternative embodiment, the table may be ordered using step wise increments in the number of macroblocks instead of bit cost. This formation would provide a measure of what bit costs result for a given number of macroblocks (i.e. bit cost is a function of number of macroblocks). It may be beneficial to use such a formation because it is more accurate when the characteristics of a given source picture of the input video sequence demands it. This may occur where the picture characteristics are such that a certain small increase in bit cost can lead to no added macroblocks but a certain increase in macroblocks always leads to a bit cost increase.

The method may include carrying out both methods, and then determining which provide the best results.

Where more than one macroblock activity category is used, e.g. low, medium and high macroblock activity categories, the above method could also be used by selecting multiple bit cost ratios, one for each macroblock activity category, and calculating the resultant thresholds by deducting the percentage of macroblocks for the lowest category from the highest category.

For example, in addition to the above low macroblock activity category, a further medium macroblock activity category could be chosen, starting from where at least 2.0% of the macroblocks have to be selected for each 0.5% increase in bit cost. For the example values shown in FIG. 4, that would result in 41.1% of the macroblocks ending up in a low macroblock activity category (i.e. lowest Qp category), and 50.5–

41.1=9.4% of macroblocks ending up in the medium macroblock activity category (i.e. medium Qp category). The remaining 49.5% of macroblocks will go into the high macroblock activity category (i.e. high Qp category).

Since the macroblock activity thresholds calculated from P Pictures are re-used on related I and B pictures, the surrounding I/B pictures will also end up with 41.1% of the macroblocks in the low Qp category and 9.4% in the medium Qp category.

Setting Qp Range

The aforementioned method steps have decided which macroblocks belong to what macroblock activity categories. However, the method now needs to determine a suitable range of Qp values that can be applied to the respective macroblock activity categories, i.e. the amount of change in Qp to apply to each macroblock activity category. This is because, for some sequences it is beneficial to have a large range of Qp values applied, and for others, it is better to apply a smaller range of Qp values.

Figure 5:
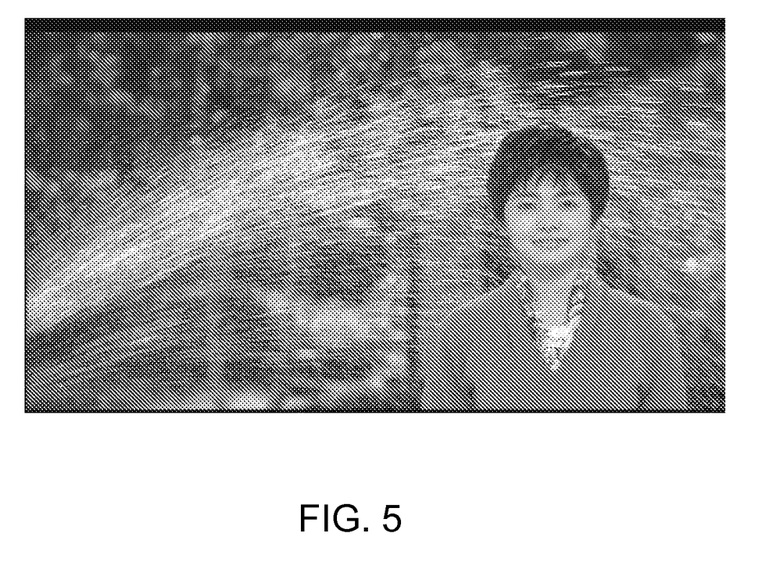
FIG. 5 shows an exemplary picture of an input video sequence with movement only in a portion of the picture, which may be used with an embodiment of the present invention.

Consider the example sequence shown in FIG. 5, which is from a video sequence where there is an area of very high activity (the spraying water part), and an area of very low activity (the virtually still person part) and thus this sequence would benefit from a large Qp range. Whereas, if the picture comprised just the left side of FIG. 5 (i.e. just the spraying water part) then the picture would have high activity across the whole picture, and thus only a small Qp range should be applied.

The proposed method to decide on a suitable Qp range is to use the difference between the average activities of macroblocks in each category, according to the following equation:

$$Qp\_range = \left(\frac{\sum_{i \in High} ActivityMB_i}{NrMacroblocksHigh} - \frac{\sum_{i \in Low} ActivityMB_i}{NrMacroblocksLow}\right) \Big/ 700 \quad (3)$$

Where $ActivityMB_i$ is the activity of the $i^{th}$ macroblock, NrMacroblocksHigh is the number of macroblocks in the High category, NrMacroblocksLow is the number of macroblocks in the Low category, and 700 is a suitable scale factor for the Qp range, found by experimentation with sample video sequences typical of the sort found in real life.

Alternatively, for sequences with very low macroblock activity, the following equation may be used instead, where the variables are the same as above, except the constant (0.4) is altered to take into account the division step being carried out instead of the subtraction step:

$$Qp\_range = \left(\frac{\sum_{i \in High} ActivityMB_i}{NrMacroblocksHigh} \Big/ \frac{\sum_{i \in Low} ActivityMB_i}{NrMacroblocksLow}\right) \Big/ 0.4 \quad (4)$$

Depending on the video sequences to which the method is being applied, it may be found that a mixture of the above two range calculations may be used instead, for example, averaging the results of both together, or applying the equivalent of a $\frac{1}{3}^{rd}$ of one and $\frac{2}{3}^{rds}$ of the other.

The Qp range as calculated by any method described above is not directly related to the number of categories in use, but instead only provides the Qp range (i.e. the maximum and minimum Qp values) in use. Where there are more than two categories, the additional categories are given suitable sub-ranges between the overall range calculated as shown above.

As a further improvement, the Qp_range could then be clamped, for example to [3, 12], so that there are no extreme Qp values applied to a target video sequence.

Setting Final Qp Offsets

In order to avoid having the Adaptive Qp method described herein work against the Rate-Control, it is preferable to set Qp offsets for the selected QP range, such that the overall number of bits generated for each picture in the video sequence of interest does not differ too much compared to a fixed Qp look-ahead encoding pass for the same picture of interest.

For the video coding standard H.264, the bit cost difference resulting from applying different Qps can be estimated using the following equation:

$$B = Bits \cdot 2^{\left(\frac{-\Delta Qp}{6}\right)} \quad (5)$$

Where $\Delta Qp$ is the difference in the Quantization parameter in use on the picture of interest, Bits is the number of bits spent on that picture of interest at an original Qp value, and B is the estimation of the number of bits needed to encode the picture if the Qp is changed by $\Delta Qp$.

For example, the above equation (5) shows that if a set of macroblocks at a quantization parameter value of Qp results in X bits for the picture, then a quantization parameter change of $\Delta Qp=-6$ would generate 2*X bits.

Since the Qp range is known from the previous step, we want to use Qp offsets that do not increase or decrease the number of bits generated for the overall picture. Consider an example where we have set the low macroblock activity category as being up to the point where the accumulated macroblock look-ahead bit costs from the look-ahead encoding pass reaches 13% of the overall picture bit cost and that the Qp value range is 9. The change in bits spent on the picture using one Qp value for the low macroblock activity category, and one Qp value for the high macroblock activity category can now be expressed as the equation:

$$B = M \cdot 2^{\left(\frac{-\Delta Qp\_Low}{6}\right)} + N \cdot 2^{\left(\frac{-\Delta Qp\_High}{6}\right)} \quad (6)$$

Figure 6:
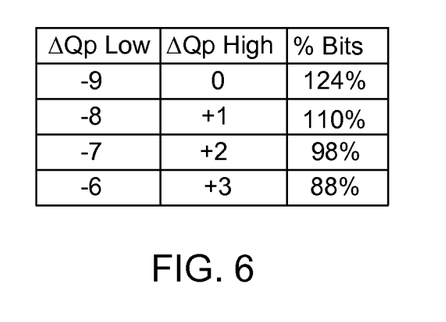
FIG. 6 shows a table detailing how changing the offset used on the Qp value alters the percentage change in output video file size.

Where:

$\Delta Qp\_Low$ is the difference in Qp value applied to a low macroblock activity category;

$\Delta Qp\_High$ is the difference in Qp value applied to a high macroblock activity category;

M is a first predetermined constant, based on the bit ratio of low category bit cost from the look-ahead encoding pass—which is 0.13 in the example; and N is a second predetermined constant, based on the bit ratio of high category bit cost from the look-ahead encoding pass—which is 0.87 in the example FIG. 6 shows the change in picture size for a Qp value range of 9, with different offsets applied, as calculated by Equation (6).

From the table of FIG. 6, it can be seen that a −7 offset for the low macroblock activity category and a +2 offset for the high macroblock activity category (i.e. an overall +2 offset from the initial 0 to −9 Qp value range) theoretically keeps the picture size at the nearest to the original size (98% of the original size). Thus, this offset is chosen by the method.

Equation (6) can be extended for cases of more than two macroblock activity categories using the generalised version:

$$\sum_{i=1}^{nr\_categories} X_i \cdot 2^{\frac{-\Delta Q p_i}{6}} \quad (6b)$$

Where:
$X_i$ is the look-ahead bit ratio for the category of interest;
$Qp_i$ is the difference in Qp value applied to a particular macroblock activity category of interest; and
all the look-ahead bit ratios add up 1 (i.e. 100%).

Figure 7:
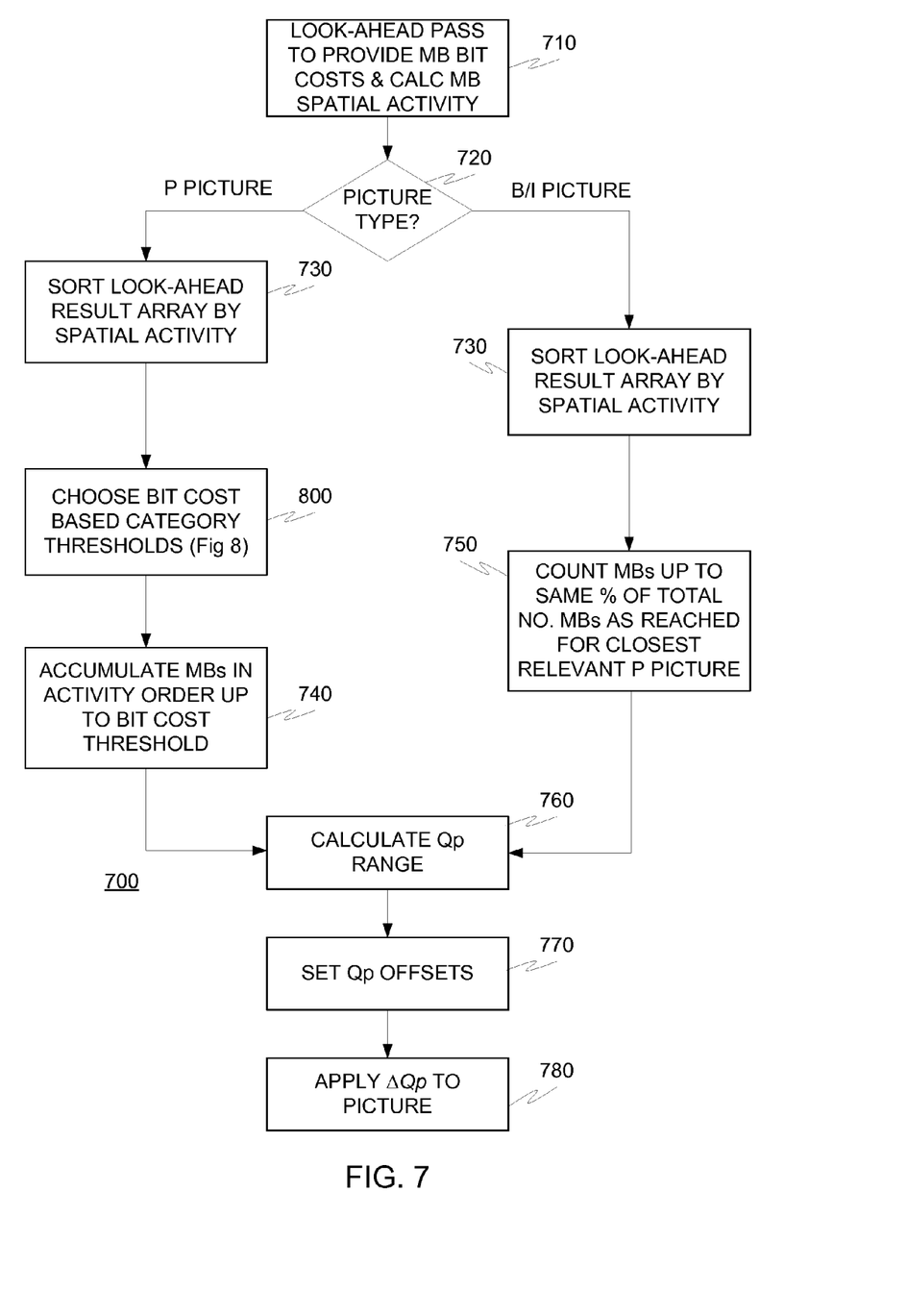
FIG. 7 shows a flow diagram of the overall method for adapting a Quantization parameter for digitally encoding video according to an embodiment of the present invention.
Figure 8:
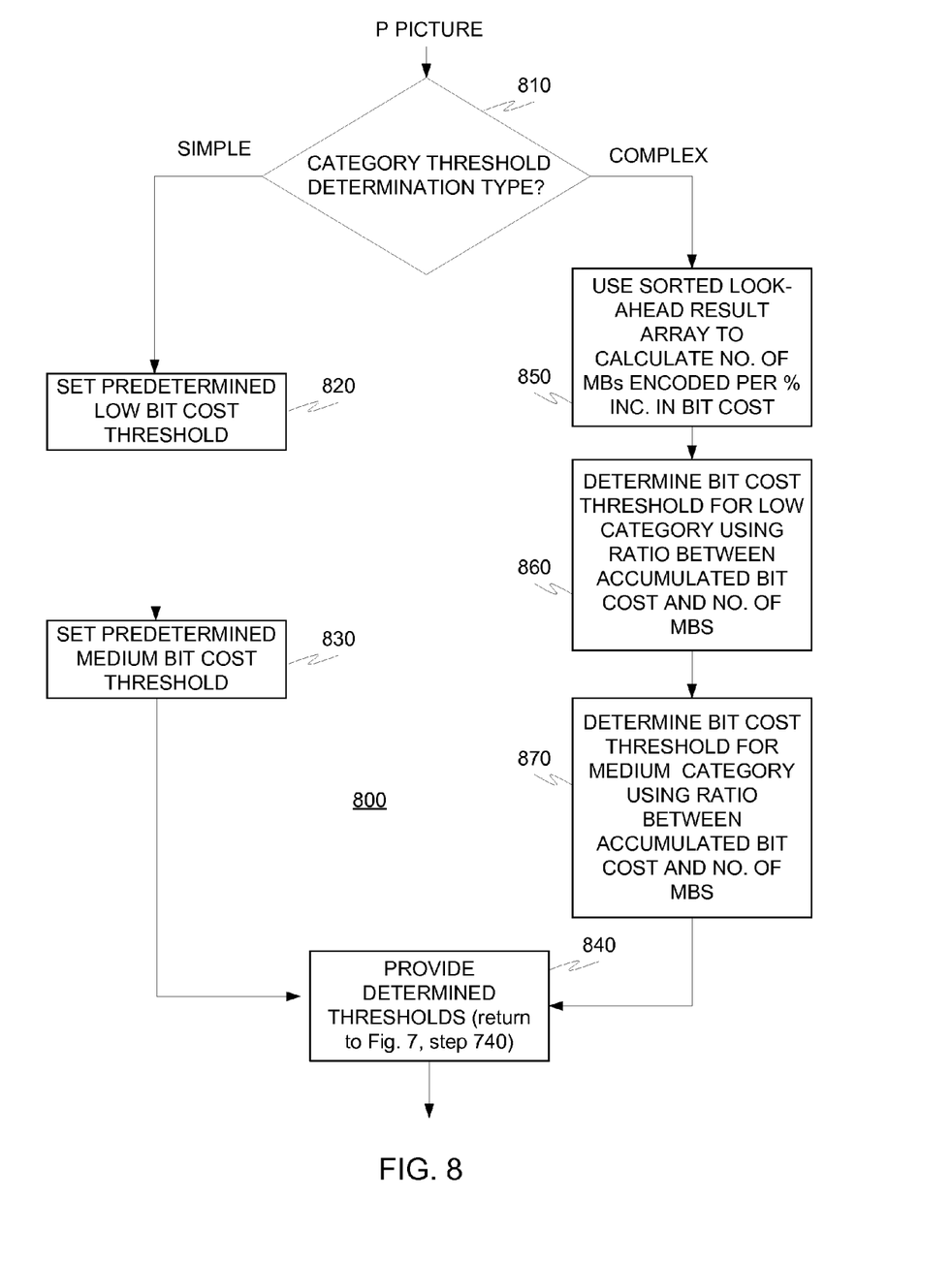
FIG. 8 shows a more detailed portion of the method of adapting a Quantization parameter for digitally encoding video, detailing how low/medium/high category thresholds are chosen according to an embodiment of the present invention.

FIG. 7 and FIG. 8 show overview flow diagrams of the above described Adaptive Quantization methods, where there are three activity categories (low, medium and high), and where FIG. 8 is a more detailed look at the category threshold setting portion 800 of FIG. 7.

In FIG. 7, the method starts by carrying out a look-ahead encoding pass over each picture in the video sequence of interest (the look-ahead encoder having the same picture type selection methodology and GOP structure, as well as scene detection methodology, as is to be used in the main video encoder) to provide a look-ahead macroblock bit cost and spatial activity metric (see equations 1 and 2 above) for each macroblock in each picture of the video sequence of interest at step 710.

At step 720, the type of picture being encoded (P vs B or I) determines how the macroblock activity category thresholds are selected and used, with the left hand portion of the flow diagram (steps 730, 800, and 740) being used for P pictures only, and the right hand side of the flow diagram (in particular step 750) only being used for I or B pictures.

Starting with the case for P pictures, at step 730, the method sorts the look-ahead results array produced by the look-ahead pass in ascending spatial activity order.

The method then applies the predetermined method of deriving the macroblock activity category thresholds at step 800, as described and shown in more detail in FIG. 8.

FIG. 8 shows both 'simple' and 'complex' forms of the macroblock activity category selection method, which may be used in alternative embodiments of the present invention, or as a combination embodiment, where either simple or complex methods of choosing the category thresholds may be used according to a further selection criteria.

The 'simple' threshold selection method simply involves setting pre-determined threshold levels for the low, medium and high macroblock activity categories (and any other further category levels, if so required) at steps 820 and 830, and returning these macroblock activity category bit cost thresholds to the main method at step 840. For example, returning a low macroblock activity category threshold of 17% of the total picture bit cost.

The 'complex' form of choosing the category thresholds starts at step 850 by using the sorted look-ahead results array to calculate the number of macroblocks encoded per % increase in bit cost for the picture of interest, as described in more detail with reference to FIG. 4.

A minimum increase in macroblocks encoded for a given % increase in bit cost for the low macroblock activity category (i.e. bit ratio threshold) is then decided at step 860, and applied to the results of step 850 to determine the low macroblock category threshold.

The bit ratio thresholds to use in embodiments may be found empirically, using a range of test sequences. For example, a good value to use for the low macroblock activity category for real life video sequences was found to be a 0.65% increase in area (i.e. no. of macroblocks) for a 0.5% increase in the number of bits used.

A minimum increase in macroblocks encoded for a given % increase in bit cost for the medium macroblock activity category is then decided at step 870, and applied to the results of step 850 to determine the medium macroblock category threshold.

The calculated macroblock activity category thresholds are again passed to the main method sequence at 840, to resume the process of FIG. 7 at step 740.

Returning to FIG. 7, once the macroblock activity category thresholds are set at step 800, the method accumulates the macroblocks bit costs in ascending activity order up to the respective thresholds at step 740, thereby providing a percentage of the total number of macroblocks in the picture of interest that totals a bit cost nearest to the determined threshold bit costs described above.

A similar accumulation step applies for each category in use (low, medium, high, or others), thereby providing an indication of which macroblocks should have what Qp value change applied.

At step 760, a suitable Qp value change range is determined, followed by a step 770 of choosing Qp offsets that provide the least change in overall picture bit cost/video bit rate, both as described in more detail above.

Finally, the adapted Qp values are applied to the video by the main encoder at step 780.

The above process is applied to all P pictures.

However, for any B or I pictures, the process uses the right hand side of FIG. 7. In particular, the processing of B or I pictures should be carried out after the P picture processing run has been carried out for all the closest surrounding P pictures in coding order, since the category thresholds from the closest surrounding P picture process are re-used, and some of the thresholds used are derived from a P picture that is subsequent in time to the current B or I picture due to scene cuts and the like. In more detail, when a B or I picture is detected, the same look-ahead results array sorting step is carried out (step 730) to produce a sorted array of macroblocks of ascending spatial activities.

In contrast to the method applied to P pictures, this time, instead of accumulating macroblock bit costs up until a percentage of the total bit cost for the picture is reached, the outright number of macroblocks reached in the P picture process, as a percentage of the total number of macroblocks in the picture, is used.

This is to say, after the sorting step takes place, a simple macroblock counting step 750 occurs, counting up to the percentage of the total number of macroblocks reached during the P picture process used on the most relevant P picture to the current B or I picture (i.e. noting to take into account any scene changes when deciding upon the most relevant P picture).

The method then returns to the common end portion of steps 760 to 780, described earlier.

The foregoing method has been described using macroblocks of 16 by 16 pixels in the picture of interest (field or frames may equally be used). However, it will be apparent that the method may equally be applied to macroblocks of any size.

The herein described Adaptive Quantization method and apparatus uses a macroblock bit cost derived from a look-ahead encoding pass to provide a bit spread across the picture of interest, which allows a more confident measure of activity variance to be calculated, thus allowing larger changes in Qp value for the adapted video bit stream, i.e. the Adaptive Quantization can be much more aggressive than under prior art adaptive quantization schemes.

Embodiments of the present invention therefore achieve a high-quality Adaptive Quantization method and apparatus that are beneficial to an HD-TV compression engine if it is to enable efficient transmission of HDTV video (i.e. which has a reasonable data rate requirement) whilst still maintaining picture quality. It is only by efficiently transmitting HDTV video that enough HDTV channels can be carried by the existing digital TV transmission infrastructure.

Equally, the same advantages of the present invention allow improvements in perceived video quality (for a given bit rate) in mobile TV applications and future ultra-High Definition Television.

The aforementioned Adaptive Quantization method is typically carried out in a video pre-processor stage before the coding stage proper. However, it may be performed as part of the video encoding itself. In the case where the method is carried out by the video pre-processor, the pre-processor analyses video picture data prior to encoding proper, to determine the optimum adaptive quantization parameter Qp to apply in the subsequent encoding step.

Figure 9:
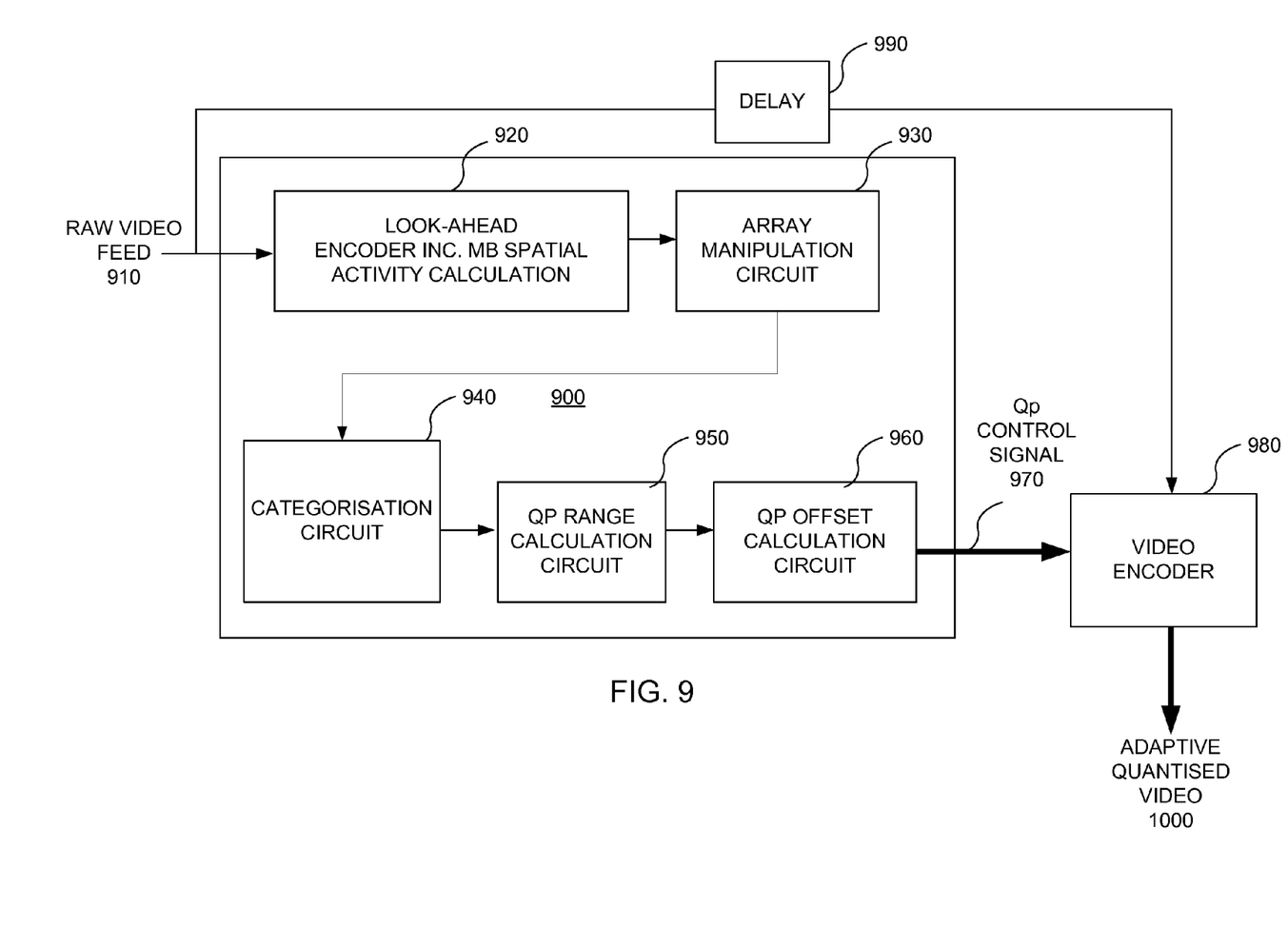
FIG. 9 shows an exemplary hardware adaptive quantization encoder according to an embodiment of the present invention.

The above described Adaptive Quantization method may be carried out by suitably adapted hardware, such as an exemplary hardware implementation of an Adaptive Quantizer 900 according to an embodiment of the invention as shown in FIG. 9.

The Adaptive Quantizer 900 is typically located between the raw video input of the overall system 910, and the video encoder 980, where it can apply the above described Adaptive Quantization methods to the raw video, in order to guide the main video encoder 980 on which Qp values should be used. The video encoder 980 also has a direct input of the raw video 910 to encode, which passes through a delay 990, in order to allow the look-ahead encoder pass to have the information from a future closest relevant P picture ready when the main video encoder 980 is dealing with an I picture of interest after a scene cut. Where the look-ahead encoding pass is carried out in its entirety before the main encoding pass, the delay may not be required. Thus, the look-ahead encoding pass can equally take the form of the look-ahead encoder 920 analysing the video of interest a predetermined period before the point in the video where the main encoder is acting.

The Adaptive Quantizer 900 comprises: a look-ahead encoder 920 providing a bit cost for each macroblock and a spatial activity for each macroblock; a result array manipulation circuit 930 for sorting the results array; a categorisation circuit 940, which carries out the above described complex categorisation process (where the simple process is used, a suitable form of data storage to contain the pre-determined thresholds will suffice); a Qp range calculation circuit 950 to carry out the above described Qp range determination method; and a Qp offset calculation circuit 960 to carry out the above described Qp offset method.

The output of the overall Adaptive Quantizer 900 is a Qp value control signal 970, used by the main encoder 980 to adaptively change the Qp parameter of the input video sequence 910 according to the above described methods.

The Adaptive Quantization method may also be embodied in a set of instructions, stored on a computer readable medium, which when loaded into a computer processor, Digital Signal Processor (DSP) or similar, causes the processor to carry out the hereinbefore described method.

Equally, the Adaptive Quantization method may be embodied as a specially programmed, or hardware designed, integrated circuit which operates to carry out the method on picture data loaded into the said integrated circuit. The integrated circuit may be formed as part of a general purpose computing device, such as a PC, and the like, or it may be formed as part of a more specialised device, such as a games console, mobile phone, portable computer device or hardware video encoder.

One exemplary hardware embodiment is that of a Field Programmable Gate Array (FPGA) programmed to carry out the described Adaptive Quantization method, located on a daughterboard of a rack mounted video encoder, for use in, for example, a television studio or location video uplink van supporting an in-the-field news team.

Another exemplary hardware embodiment of the present invention is that of a video pre-processor comprising an Application Specific Integrated Circuit (ASIC).

For some applications of Adaptive Quantization, quality of the output video is more important than the cost of carrying out the encoding. This is especially the case for broadcast High Definition TV (HDTV). The present invention therefore provides an improved method and apparatus for Adaptive Quantization of video for such applications.

Where the terms "macroblock of interest", "pixel of interest", or "target video sequence" are used herein, it is to mean the macroblock or the pixel currently being processed by the described method, or the video sequence to which the method is currently being applied.

It will be apparent to the skilled person that the exact order and content of the steps carried out in the method described herein may be altered according to the requirements of a particular set of execution parameters, such as speed of encoding, accuracy of detection, and the like. Accordingly, the claim numbering is not to be construed as a strict limitation on the ability to move steps between claims, and as such portions of dependent claims may be utilised freely.

The invention claimed is:

1. A method of adapting a Quantization parameter of digitally encoded video, comprising:
   using a look-ahead encoding pass to provide look-ahead bit costs for each macroblock in a picture of interest;
   calculating an activity metric for each macroblock in the picture of interest;
   determining at least an accumulated look-ahead bit cost threshold for a low macroblock activity category, wherein the low macroblock activity category comprises macroblocks having an activity metric below a pre-determined level;
   sorting the macroblocks according to the calculated activity metrics of each macroblock to provide sorted macroblocks;
   adding sorted macroblocks to the low macroblock activity category in ascending activity order and accumulating bit costs of the added sorted macroblocks up to the determined accumulated look-ahead bit cost threshold;
   applying a change in quantization parameter, Qp, to the macroblocks of the picture of interest comprising decreasing the Qp value of the macroblocks in the low macroblock activity category; and
   wherein the determined accumulated look-ahead bit cost threshold is determined by providing an accumulated look-ahead bit cost threshold based upon:
     a required minimum increase in a number of macroblocks encoded for a given percentage increase in look-ahead bits used; or
     a required minimum percentage increase in look-ahead bits used for a given number of macroblocks encoded.

2. The method of claim 1, wherein the activity metric comprises: S, where S is a spatial activity metric.

3. The method of claim 1, further comprising increasing the Qp value of the macroblocks remaining outside the low macroblock activity category or keeping the same Qp value.

4. The method of claim 1, wherein the step of determining at least an accumulated look-ahead bit cost threshold for a low macroblock activity category further comprises:
   determining an accumulated look-ahead bit cost threshold for a medium macroblock activity category;
   wherein the sorted macroblocks from zero activity to the accumulated look-ahead bit cost threshold for a low macroblock activity category are in a low activity category, macroblocks from the accumulated look-ahead bit cost threshold for a low macroblock activity category to the accumulated look-ahead bit cost threshold for a medium macroblock activity category are in a medium activity category, and a remaining number of macroblocks outside of the low and medium macroblock activity categories are in a high macroblock activity category.

5. The method of claim 1, wherein the accumulated look-ahead bit cost threshold determination step further comprises:
   calculating how many macroblocks of the picture of interest are encoded for each percentage increase in accumulated total bit cost; and
   calculating a change in number of macroblocks encoded per percentage increase in total bit cost.

6. The method of claim 3, wherein the decrease in quantization parameter, Qp, of macroblocks in the low macroblock activity category and the increase in the Qp of the remaining macroblocks comprises a Qp value range, and the method further comprises: setting the Qp value range, according to one of the equations:

$$QP\_range = \left( \frac{\sum_{i \in High} ActivityMB_i}{NrMacroblocksHigh} - \frac{\sum_{i \in Low} ActivityMB_i}{NrMacroblocksLow} \right) / K_1$$

OR $$QP\_range = \left( \frac{\sum_{i \in High} ActivityMB_i}{NrMacroblocksHigh} / \frac{\sum_{i \in Low} ActivityMB_i}{NrMacroblocksLow} \right) / K_2$$

wherein:
   ActivityMB$_i$ is the activity of the i$^{th}$ macroblock;
   NrMacroblocksHigh is the number of macroblocks in the High category;
   NrMacroblocksLow is the number of macroblocks in the Low category;
   K1 is a first subtraction scale factor; and
   K2 is a second division scale factor.

7. The method of claim 3, wherein a compression standard in use is H.264, and the method further comprises offsetting the change in Qp, such that an overall adjusted bit cost of the picture of interest remains substantially similar to an initial bit cost estimate, using the equation:

$$B = \sum_{i=1}^{nr\_categories} X_i \cdot 2^{\frac{-\Delta Qp_i}{6}}$$

wherein:
   $X_1$ is a look-ahead bit ratio for a particular macroblock activity category of interest;
   $Qp_1$ is a difference in Qp value applied to a particular macroblock activity category of interest; and all the look-ahead bit ratios add up 1 (i.e. 100%).

8. The method of claim 1, wherein the steps of:
   determining at least an accumulated look-ahead bit cost threshold for a low macroblock activity category; and
   adding macroblocks to the low macroblock activity category in ascending order up to the determined look-ahead bit cost threshold, are only applied to P pictures, and the method for B or I pictures instead comprises:
   determining a percentage of a total number of macroblocks in a picture of interest that corresponds to the number of macroblocks accumulated for a closest surrounding relevant P picture; and
   counting macroblocks sorted in order of ascending activity metrics, up to the determined percentage of the total number of macroblocks accumulated for a closest surrounding relevant P picture.

9. The method of claim 1, wherein the look-ahead encoding pass uses a fixed Qp value.

10. The method of claim 9, further comprising carrying out multiple look-ahead encoding passes at different Qp values and determining a most suitable set of results.

11. The method of claim 1, wherein the look-ahead encoding pass comprises a variable Qp value derived from a rate control function that tracks an output bit rate target.

12. An Adaptive Quantizer adapted to carry out the method of claim 1, and comprising: a look-ahead encoder adapted to provide look-ahead bit cost and activity metrics for each macroblock in a picture of interest; an array manipulation circuit; and a categorisation circuit.

13. A non-transitory computer-readable medium, carrying instructions, which, when executed, causes computer logic to carry out the method of claim 1.

* * * * *